United States Patent [19]

Ellis et al.

[11] 4,158,813

[45] Jun. 19, 1979

[54] COMBINED MICROPHONE AND ACCESSORY DEVICE

[75] Inventors: Robert W. Ellis; Charles D. Manaton, both of Tampa, Fla.

[73] Assignee: Tampa Air Electronics, Tampa, Fla.

[21] Appl. No.: 814,215

[22] Filed: Jul. 11, 1977

[51] Int. Cl.² .............................................. H04B 1/04
[52] U.S. Cl. ...................................... 325/102; 325/21; 179/179; 320/DIG. 1
[58] Field of Search ....................... 325/16, 15, 21, 22, 325/66, 102, 111, 114, 115, 117, 118, 119, 185, 186; 179/1 A, 2 E, 2 TC, 179, 111 R; 340/248 Y; 320/DIG. 1

[56] References Cited

U.S. PATENT DOCUMENTS

| | | | |
|---|---|---|---|
| 3,281,639 | 10/1966 | Potter et al. | 320/DIG. 1 |
| 3,305,638 | 2/1967 | Teachout | 179/1 A |
| 3,327,198 | 6/1967 | Rauch | 320/DIG. 1 |
| 3,413,537 | 11/1968 | Sharp et al. | 320/DIG. 1 |
| 3,604,853 | 9/1971 | Pless | 179/179 |
| 3,969,673 | 7/1976 | Nordloff | 325/16 |
| 4,032,844 | 6/1977 | Imazeki | 325/15 |
| 4,044,292 | 8/1977 | Tomlin | 325/16 |
| 4,096,439 | 6/1978 | Hochstein | 325/21 |

Primary Examiner—Robert L. Griffin
Assistant Examiner—Jin F. Ng
Attorney, Agent, or Firm—Stein & Frijouf

[57] ABSTRACT

A combined microphone and accessory device is disclosed for operation with a transmitter radio having a microphone audio circuit and a transmitter activating circuit. The transmitter activating circuit has a first and a second terminal with a potential established therebetween for activating the transmitter radio upon conduction of a given current level between the first and second terminals. The invention comprises a microphone housing having a microphone adapted for connection to the microphone audio circuit of the transmitter radio. A microphone key switch is mounted to the microphone housing and adapted for connection to the transmitter activating circuit for conducting the given current level between the first and second terminals upon closing the microphone key switch to activate the transmitter radio. An accessory device such as an illumination device, a timer or a calculator, is mounted in the microphone housing and is powered by a rechargeable battery within the microphone housing. An accessory switch connects the rechargeable battery to power the accessory device upon closing the accessory switch. A recharging circuit connects the first and second terminals to the rechargeable battery for charging the rechargeble battery at a current level less than the given current level required to activate the transmitter radio. The foregoing abstract is merely a resume of one general application, is not a complete discussion of all principles of operation or applications, and is not to be construed as a limitation on the scope of the claimed subject matter.

12 Claims, 3 Drawing Figures

U.S. Patent     Jun. 19, 1979     4,158,813
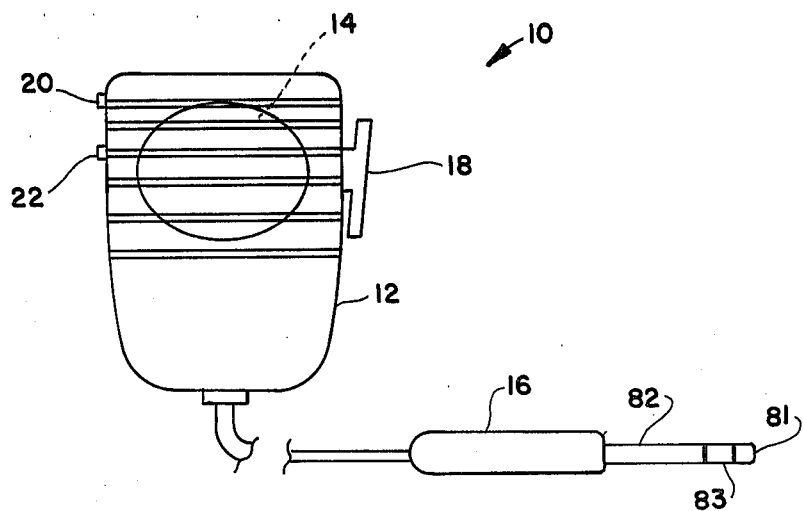
FIG. 1
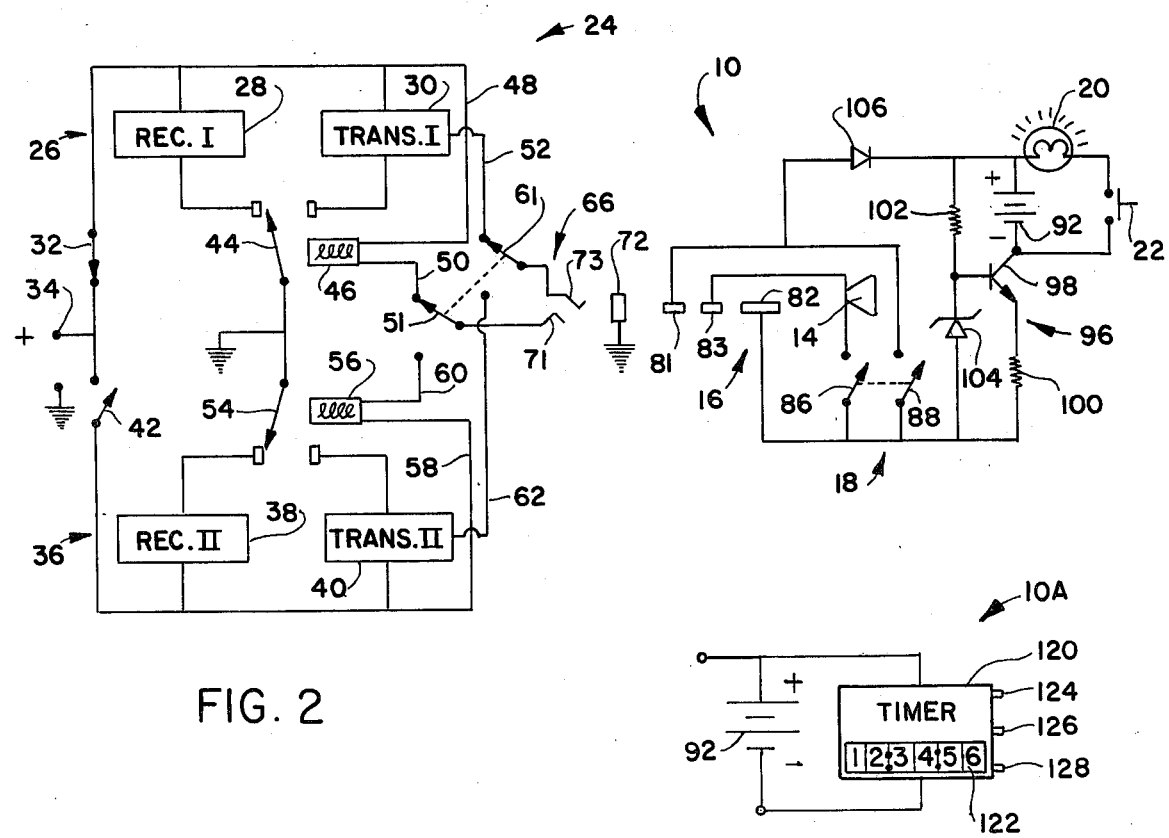
FIG. 2
FIG. 3

COMBINED MICROPHONE AND ACCESSORY DEVICE

BACKGROUND OF THE INVENTION

1. Field of the Invention

This invention relates to accessory devices and more particularly to accessory devices which are combined with microphones or telephones.

2. Description of the Prior Art

Numerous types of devices have been developed by the prior art for providing illumination during communication via a microphone or a telephone. Both integral and auxiliary bulbs have been combined with telephones for illuminating the dial of the telephone or a telephone number or note sheet. The auxiliary illumination devices included a battery which was separate and independent of the audio circuit of the telephone or microphone device. When the charge on the battery was depleted, the user would merely replace the battery with a new or recharged battery. In the integral illuminating devices, the illumination device received electrical power from either the audio circuit or a separate circuit connected to conventional household wiring.

An important application for a combined microphone and illuminating or other accessory device is the area of two-way radio transmitters. In general, the transmitter radio has a microphone audio circuit for receiving electrical signals produced by the microphone, which electrical signals modulate a radio frequency carrier wave. The transmitter radio also includes a transmitter activation circuit generally having a first and a second terminal with a potential established therebetween. A microphone key switch interconnects the first and second terminals to activate the transmitter radio upon closing the microphone key switch. In many transmitter radios, a relay type device is incorporated in the transmitter activating circuit to energize the radio frequency circuits within the transmitter radio when a given current level flows between the first and second terminals.

The present industrial standard for most transmitter radio equipment includes a three, four or five conductor jack disposed within the transmitter housing for receiving a multiple conductor plug connected to a microphone device. The first jack conductor is connected to the transmitter activating circuit, the second jack conductor is connected to a ground circuit, and the third jack conductor is connected to the microphone audio circuit. A microphone key switch comprising a first and a second switch interconnect the first and third plug conductor with the second plug conductor. Accordingly, upon closing the microphone key switch, the microphone audio circuit is concomitantly energized with the transmitter activating circuit thereby enabling the audio signals generated by the microphone to modulate the radio frequency carrier wave of the transmitter.

There is a need in the art for a combined microphone-illumination or another accessory device which is compatible for use with the aforementioned standard transmitter radio and which may be incorporated therein without interrupting the normal operation throef.

Therefore, it is an object of this invention to provide an apparatus which overcomes the aforementioned inadequacies of the prior art devices and provides an improvement which is a significant improvement to the advancement of the microphone and accessory art.

Another object of this invention is to provide a combined microphone and accessory device including a constant current circuit which extracts a current level less than the given current level required to activate the radio transmitter. This given current level may be used as a power supply for such electronic applications as recharging rechargeable batteries, timing and calculator circuits.

Another object of this invention is to provide a combined microphone and accessory device for operation with a transmitter radio including the accessory device mounted to the microphone housing and powered by a rechargeable battery. A recharging circuit is connected for recharging the battery from a potential normally used for activating the transmitter radio the recharging current flow is less than the given current level required to activate the transmitter radio.

Another object of this invention is to provide a combined microphone and accessory device for operation with a transmitter radio including a constant current generator for charging the rechargeable battery at a current level less than the current required to activate the transmitter radio.

Another object of this invention is to provide a combined microphone and accessory device for operation with a transmitter radio incorporated within a conventional microphone housing and using a standard multiple conductor plug receivable within a conventional transmitter without interferring with the normal operation of the transmitter radio.

Another object of this invention is to provide a combined microphone and accessory device for operation with a transmitter radio which may be manufactured as a microphone, a connecting cord and plug for operation with substantially all commercial two-way transmitter radio equipment.

Another object of this invention is to provide a combined microphone and accessory device with the accessory device comprising an illumination device and/or an electronic timing or calculating device for operation with a transmitter radio.

Other objects and a fuller understanding of this invention may be had by referring to the summary of the invention, the description and the claims, taken in conjunction with the accompanying drawings.

SUMMARY OF THE INVENTION

The invention may be incorporated into a combined microphone and accessory device for operation with a transmitter radio having a microphone audio circuit and a transmitter activating circuit. The transmitter activating circuit has a first and a second terminal with a potential established therebetween for activating the transmitter radio means upon conduction of a first current level between the first and second terminals. The invention comprises a microphone housing and a microphone mounted in the housing and adapted for connection to the microphone audio circuit of the transmitter radio means. A microphone key switch is mounted to the microphone housing and adapted for connection to the transmitter activating circuit for conducting the first current level between the first and second terminals closing closing the microphone key switch activates the transmitter radio means. An accessory device is mounted to the microphone housing and includes a rechargeable battery means. An accessory switch connects the rechargeable battery to power the accessory device upon closing the switch. A recharging circuit is connected to the first and second terminals to recharge the battery at a second third current level which is less than the first current level required to activate the transmitter radio.

More specifically, the recharging circuit may include a constant current generator for charging the rechargeable battery. The recharging circuit may include a transistor having a collector-emitter circuit connected in a series with the rechargeable battery. A Zener diode is connected for biasing the transistor to provide the constant current generator.

The microphone and the microphone key switch are connected to a plug which is receivable in the transmitter radio means. More specifically, the plug includes a multiple conductor plug receivable in a multiple conductor jack of the transmitter radio. The first, second and third conductors of the jack are respectively connected to the transmitter activating circuit, transmitter ground circuit and the microphone audio circuit. The microphone key switch includes a first and a second switch respectively connecting the first and third connectors to the ground connector for simultaneously activating the microphone audio circuit and the transmitter activating circuit upon closing the microphone key switch.

The recharging circuit comprises a constant current generator connected in series with the rechargeable battery between the first and second conductors. The constant current generator insures that the recharging current is less than the first current level required for activating the transmitter activating circuit. Means such as a diode may be included for preventing discharge of the rechargeable battery on closing the microphone key switch. The recharging circuit, the rechargeable battery and the accessory device may be mounted within the microphone unit for existing radio transmitters.

Another object of this invention is to provide a combined microphone and constant current circuit for connection between the first and second terminals. The invention extracts a second current level between first and second terminals which is less than the first current level required to activate the transmitter radio. The invention is compatible with a potential difference between the first and second terminals of 10 to 32 volts of direct current normally found on two-way radio equipment.

This invention accordingly comprises an apparatus possessing the features, properties and the relation of elements which will be exemplfied in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is an elevational view of the preferred embodiment of the invention showing a combined microphone and accessory illumination device for operation with a transmitter radio;

FIG. 2 is a schematic diagram of the combined microphone and illumination device in relation with pertinent portions of the circuit of the transmitter radio; and FIG. 3 is a partial schematic diagram of a combined microphone and timer device.

Similar reference characters refer to similar parts throughout the several views of the drawings.

DETAILED DESCRIPTION OF THE DRAWINGS

FIG. 1 is an elevational view of a combined microphone and accessory device 10 for operation with a radio transmitter. In this embodiment, the accessory device is an illumination device. The device 10 comprises a microphone housing 12 with a microphone 14 mounted in the housing 12 and adapted for connection to the radio transmitter by a plug 16. A microphone key switch 18 is also connected through plug 16 for activating the transmitter radio. The illumination device includes a light producing device 20 shown as a miniature incandescent bulb and an accessory or an illumination switch 22 shown as a push-button switch. The internal structure of the device 10 shown in FIG. 1 and the relation with the transmitter radio will be fully explained with reference to FIG. 2.

FIG. 2 illustrates the device 10 with a typical two-way radio 24, similar to radios used in aircraft. The radio 24 comprises a first radio 26 having a first receiver 28 and a first transmitter 30 each connected through a power switch 32 to a positive power source 34. A second radio 36 comprises a second receiver 38 and a second transmitter 40 each connected through a power switch 42 to the positive power source 34. This is a typical arrangement in a aircraft wherein two separate radios each having a receiver and a transmitter are utilized to insure radio communication. The first receiver 28 and transmitter 30 are connected through a relay switch 44 to electrical ground to complete the power circuit. A relay coil 46 is connected by conductor 48 to the positive power source 34. Similarly, the second receiver 38 and transmitter 40 are connected through a relay switch 54 to electrical ground to complete the power circuit. A relay coil 56 is connected by conductor 58 to power source 34. Conductors 50 and 60 connect coils 46 and 56 to a selecter switch 51. Conductors 52 and 62 respectively connect the microphone audio circuit in each of transmitters 30 and 40 to a switch 61. Switches 51 and 61 are ganged as indicated by the dash line. Switch 51 and 61 are respectively connected to a jack 66 having first, second and third conductors 71, 72 and 73 with the second conductor 72 connected to electrical ground.

The device 10 is shown in schematic form in FIG. 2 with the plug 16 having first, second and third conductors 81, 82 and 83 which are cooperable with the first, second and third conductors 71-73 of jack 66. The microphone key switch 18 has a first and second switch 86 and 88 which are ganged as indicated by the dash line. The first switch 86 interconnects the second and third conductors 82 and 83 through the microphone 14. The second switch 88 interconnects the first conductor 81 to the second conductor 82 upon closing the second switch 88.

The circuit heretofore described is a conventional two-way aircraft radio and associated microphone circuit. The insertion of plug 16 into jack 66 causes interconnection of contacts 71-73 with contacts 81-83. In this example, operation of the first receiver 28 and the first transmitter 30 has been selected by the positions of switches 32, 51 and 61. Of course, it is understood that changing the positions of switches 32, 42 51 and 61 will activate the second receiver 38 and second transmitter 40. With the microphone key switch 18 shown in the open position, relay switches 44 and 54 respectively ground the first and second receivers 28 and 38. Accordingly, first receiver 28 will be operating to receive incoming messages. Upon closing microphone key switch 18, second switch 88 causes current to flow through conductors 48, coil 46, conductor 50 and between contacts 81 and 82 to change the position of switch 44 thereby energizing the transmitter 30 and de-energizing receiver 28. A first current level is required for providing sufficient current through coil 46 to change to the position of relay switch 44. This current is controlled by the potential difference between positive power source 34 and ground. This voltage may vary between 10 volts and 34 volts, depending upon the radio. Concomitantly therewith, first switch 86 connects microphone 14 to the microphone audio circuit between conductor 73 and ground 72 for modulating the radio frequency carrier wave.

The present invention provides unique means for associating an accessory device with the transmitter activation circuit. The accessory device bulb 20 is connected to a rechargeable battery 92 by the spring-loaded switch 22. Depressing switch 22 causes a current level to flow from battery 92 to power bulb 20. A constant current generator circuit 96 comprising a transistor 98 is provided with the battery 92 connected in the collector-emitter circuit. Emitter resistor 100, resistor 102 and Zener diode 104 operate transistor 98 as a constant current generator. The values of the resistors 100 and 102 and the Zener diode 104 maintain the second charging current level through battery 92 below 15 milliamperes to avoid activation of transmitter 30. The constant current generator limits the charging current, irrespective of the voltage system used in the transmitter radio which may vary between 10 volts to 34 volts. Diode 106 prevents discharge of battery 92 when microphone key switch 18 is closed.

In a specific example of the instant invention, a 2N708 transistor was used with a 9.1 volt Zener diode. Resistor 100 was 20,000 ohms with resistor 102 being 750 ohms. A 1.5 volt nickel cadmium battery was used as the battery 92. It was determined that this configuration satisfies the conditions for substantially all of the existing aircraft radios.

FIG. 3 is a partial schematic diagram of a device 10A for combining a microphone device and a timer 120. The timer 120 may be connected in parallel with an illumination bulb 20, shown in FIG. 2, or may be individually mounted in the microphone housing 12 shown in FIG. 1. The timer includes a display 122 which may incorporate light emitting diodes (LED), liquid crystal display (LCD) or the like. In this embodiment, the display 122 shows the true time or date upon depression of a display switch 124. To measure elapsed time, a start switch 126 is depressed whereat the display 122 shows the time elapsing since depression of switch 126. A stop switch 128 enables the lapsed time to be frozen. Depression of switch 126 will restart and reset timer 120. It should be appreciated that the switches 126 and 128 are mounted on the exterior portion of the microphone housing 12 with the display 122 located for easy readability on the housing 12. Numerous variations of the timer device 120 and the use of the switches 124, 126 and 128 may be resorted to without varying from the disclosed invention. It should also be appreciated that the timer device 120 may also include a calculator using conventional circuitry well known in the art.

Although the instant invention has been described in association with an aircraft radio system, it should be understood that the present disclosure has only been in the way of example, and that the system can be operated in any type of mobile or fixed radio having the specific characteristics as set forth herein. For example, military, taxicab, citizen's band, marine, and other types of radio devices are compatible for use with the instant invention.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention.

What is claimed is:

1. An accessory device mounted to a microphone for operation from the power of a transmitter radio means having a microphone audio circuit and a transmitter activating circuit; the transmitter activating circuit having a first and a second terminal with a potential established therebetween for activating the transmitter radio means upon conduction of a first current level between the first and second terminals comprising, in combination:

a microphone housing;
   a microphone mounted in said housing and adapted for connection to the microphone audio circuit of the transmitter radio means;
   a microphone key switch mounted to said microphone housing and adapted for connection to the transmitter activating circuit for conducting the first current level between the first and second terminals upon closing said microphone key switch to activate the transmitter radio means;
   an accessory device mounted to said microphone housing including a rechargeable battery means;
   accessory switch means interconnecting said rechargeable battery and said accessory device for enabling flow of current therebetween to activate said accessory device upon closing said accessory switch means; and
   recharging circuit means including current limiting means connecting said first and second terminals to said rechargeable battery for charging said rechargeable battery at a second current level which is less than the first current level required to activate the transmitter radio means.

2. A device as set forth in claim 1, wherein said recharging circuit means includes a constant current generator means for charging said rechargeable battery.

3. A device as set forth in claim 1, wherein said recharging circuit means includes means for preventing discharge of said rechargeable battery upon closing of said microphone key switch means.

4. A device as set forth in claim 1, wherein said recharging circuit means includes transistor means having the transistor collector-emitter circuit connecting in series with said rechargeable battery means.

5. A device as set forth in claim 4, wherein said recharging circuit means includes Zener diode means connected for biasing said transistor means for providing a constant current generator.

6. A device as set forth in claim 1, wherein said microphone and said microphone key switch are connected to a plug receivable in a jack in the transmitter radio means.

7. A device as set forth in claim 1, including a multiple conductor plug receivable in a jack of the transmitter radio means;

a first, second and third conductor of the jack being respectively connected to the transmitter activating circuit, and the transmitter ground circuit and the microphone audio circuit; and said microphone key switch means includes a first and a second switch respectively connecting the first and third connectors to the ground connector for simultaneously activating the microphone audio circuit and the transmitter activating circuit.

8. A device as set forth in claim 7, wherein said recharging circuit means comprises a constant current generator connected in a series with said rechargeable battery between the first and the second connectors.

9. A device as set forth in claim 1, wherein said rechargeable battery is mounted within said microphone housing.

10. A device as set forth in claim 1, wherein said accessory device includes an illumination device.

11. A device as set forth in claim 10, wherein said illumination device includes an incandescent lamp.

12. A device as set forth in claim 1, wherein said accessory device includes a timing device.

* * * * *